(12) United States Patent
Morota

(10) Patent No.: US 7,778,049 B2
(45) Date of Patent: Aug. 17, 2010

(54) SWITCHING POWER SUPPLY

(75) Inventor: Naohiko Morota, Hyogo (JP)

(73) Assignee: Panasonic Corporation, Osaka (JP)

( * ) Notice: Subject to any disclaimer, the term of this patent is extended or adjusted under 35 U.S.C. 154(b) by 325 days.

(21) Appl. No.: 12/115,911

(22) Filed: May 6, 2008

(65) Prior Publication Data

US 2009/0001954 A1    Jan. 1, 2009

(30) Foreign Application Priority Data

Jun. 28, 2007   (JP)  ............................. 2007-169837

(51) Int. Cl.
  *H02M 3/335*   (2006.01)
(52) U.S. Cl. ............... 363/21.12; 363/21.17; 363/21.18
(58) Field of Classification Search ............. 363/21.12, 363/21.16, 21.17, 21.18, 21.01
  See application file for complete search history.

(56) References Cited

U.S. PATENT DOCUMENTS

| | | | | |
|---|---|---|---|---|
| 7,099,164 B2 * | 8/2006 | Zhu et al. | ................. | 363/21.12 |
| 7,116,564 B2 * | 10/2006 | Takahashi | ................. | 363/21.12 |
| 7,394,670 B2 * | 7/2008 | Koike | ..................... | 363/21.16 |
| 2005/0078493 A1 * | 4/2005 | Kim et al. | ................. | 363/21.16 |
| 2005/0213355 A1 * | 9/2005 | Koike | ..................... | 363/21.16 |
| 2005/0259448 A1 * | 11/2005 | Koike | ..................... | 363/21.01 |
| 2007/0132438 A1 * | 6/2007 | Jang et al. | ................... | 323/282 |
| 2007/0182387 A1 * | 8/2007 | Weirich | ..................... | 323/234 |

FOREIGN PATENT DOCUMENTS

EP            1 211 794           6/2002

* cited by examiner

*Primary Examiner*—Bao Q Vu
*Assistant Examiner*—Jue Zhang
(74) *Attorney, Agent, or Firm*—Steptoe & Johnson LLP

(57) ABSTRACT

A switching power supply is provided which keeps constant, even when the oscillation frequency of a switching element increases, the on duty of secondary current passing through a secondary winding, thereby achieving a constant current drooping characteristic with high accuracy. To be specific, a secondary current on-period detection circuit generates a signal indicating the off timing of the secondary current, based on a flyback voltage generated on an auxiliary winding. A secondary-current detection delay time correction circuit generates a signal indicating a time when a predetermined period has elapsed since the switching element is turned off. A secondary current on-duty control circuit generates a clock signal for turning on the switching element so as to keep constant the on duty of the secondary current, based on the signal generated by the secondary current on-period detection circuit and the signal generated by the secondary-current detection delay time correction circuit.

11 Claims, 7 Drawing Sheets

SWITCHING POWER SUPPLY

FIELD OF THE INVENTION

The present invention relates to a switching power supply for realizing a constant current drooping characteristic.

BACKGROUND OF THE INVENTION

For example, as power supply units for chargers, small switching supply units have been generally used each of which includes an output voltage detection circuit, a constant current control circuit, and a photocoupler on the secondary side to realize constant voltage control and a constant current drooping characteristic.

Further, a switching power supply further reduced in size is proposed which does not include an output voltage detection circuit, a constant current control circuit, and a photocoupler on the secondary side and realizes the functions of the circuits and the photocoupler on the primary side (for example, see European Patent Application Publication No. 1211794).

In this conventional switching power supply, the timing of the end of secondary current passing through the secondary winding of a transformer (the off timing of the secondary current) is detected by detecting the timing of the falling edge of a flyback voltage generated on the auxiliary winding of the transformer, so that a period during which the secondary current passes through the secondary winding (the on period of the secondary current) is detected. The secondary current starts flowing when a switching element is turned off. And then, the conventional switching power supply generates a signal (secondary duty control signal) V2_on indicating the on period of the secondary current having been detected thus and controls the oscillation frequency (switching frequency) of the switching element such that the signal V2_on has a constant duty ratio D2on'. Thus the secondary current has a constant duty ratio D2on and a constant current drooping characteristic is realized.

The duty ratio D2on of the secondary current is expressed by the following equation:

$$D2on = t2on/T$$

where t2on represents the on period of the secondary current and T represents the oscillation period of the switching element.

Referring to FIG. 6, operations in the constant current region of the conventional switching power supply will be described below. FIG. 6 is a timing chart showing signal waveforms in the constant current region of the conventional switching power supply. FIG. 6 shows, from the top, the waveform of a drain current Ids passing through the switching element, the waveform of a flyback voltage TR generated on the auxiliary winding, the waveform of the secondary duty control signal V2_on, and the waveform of a secondary current I2p.

The conventional switching power supply generates the secondary duty control signal V2_on by detecting the timing of a falling edge on the waveform of the flyback voltage TR generated on the auxiliary winding. The secondary duty control signal V2_on is at a high level from when the waveform of the drain current Ids is turned off to when the waveform of the flyback voltage TR falls, and is at a low level from when the waveform of the flyback voltage TR falls to when the switching element is subsequently turned on and is turned off again. And then, the conventional switching power supply controls a switching frequency so as to keep constant the duty ratio D2on' of the secondary duty control signal V2_on, so that the duty ratio D2on of the secondary current I2p is also kept constant.

The duty ratio D2on' is expressed by the following equation:

$$D2on' = tron/T$$

where tron represents a period from when the waveform of the drain current Ids is turned off to when the waveform of the flyback voltage TR falls, and T represents the oscillation period of the switching element.

However, only by controlling the oscillation frequency of the switching element so as to keep D2on' constant, a constant current drooping characteristic cannot be realized with high accuracy. The reason why will be described below.

The flyback voltage TR generated on the auxiliary winding starts declining after the secondary current I2p stops flowing, and has a gradually changing waveform because the waveform is a resonance waveform of the inductance of the transformer and the capacitance of the switching element. Further, a set voltage for detecting the timing of the falling edge of the flyback voltage TR is generally set low in response to fluctuations in input voltage. Therefore, a detection delay time Δtr occurs from when the secondary current I2p stops flowing to when the timing of the falling edge of the flyback voltage TR is detected.

The detection delay time Δtr is kept constant regardless of the output. The time delay Δtr is defined by an inductance L of the transformer and a capacitance C between the drain and source of a power MOSFET composing the switching element, and is proportionate to $(LC)^{1/2}$. On the other hand, in the constant current region for controlling the switching frequency so as to keep D2on' constant, the switching frequency increases with an output voltage. Therefore, in the constant current region, as the output voltage increases, the duty ratio D2on of the secondary current I2p is reduced by the influence of the detection delay time Δtr. Consequently, the output current decreases.

FIG. 7 shows the output characteristics of the conventional switching power supply. As shown in FIG. 7, in the conventional switching power supply, as an output voltage Vo increases in the constant current region, the switching frequency is increased and an output current Io is reduced by the influence of the detection delay time Δtr. Conversely, as the output voltage Vo decreases, the switching frequency decreases, the influence of the detection delay time Δtr diminishes, D2on comes close to D2on', and the output current Io increases.

As described, even when D2on' is controlled to a constant ratio, the duty ratio D2on of the secondary current I2p changes with a load. Thus the output current Io also changes with a load and a constant current drooping characteristic cannot be obtained with high accuracy.

Higher switching frequencies are effective for the size reduction of a switching power supply. However, as described, the influence of the detection delay time Δtr cannot be eliminated and a constant current characteristic with high accuracy is harder to obtain at higher frequencies in the conventional switching power supply. For this reason, it is difficult to reduce the size of the conventional switching power supply.

DISCLOSURE OF THE INVENTION

In view of the problem of the prior art, an object of the present invention is to provide a switching power supply which can keep constant the on duty of secondary current passing through a secondary winding and realize a constant current drooping characteristic with high accuracy even when the oscillation frequency of a switching element increases.

In order to attain the object, a first switching power supply of the present invention, including:

a transformer having a primary winding and a secondary winding;

a switching element connected to the primary winding;

a control circuit for performing switching control on a first DC voltage inputted to the switching element through the primary winding, by controlling the switching operation of the switching element; and an output voltage generating section for converting a voltage generated on the secondary winding by the switching operation of the switching element into a second DC voltage, and supplying the second DC voltage to a load, wherein the control circuit includes:

a drain current limiter circuit for generating a signal for turning off the switching element when a current passing through the switching element reaches a set value;

a secondary current on-period detection circuit for detecting, from a voltage generated on each winding of the transformer by the switching operation of the switching element, the off timing of secondary current starting passing through the secondary winding when the switching element is turned off, and generating a signal indicating the detected off timing of the secondary current;

a secondary-current detection delay time correction circuit for generating a signal indicating a time when a predetermined period has elapsed since the switching element is turned off; and a secondary current on-duty control circuit for oscillating a clock signal for turning on the switching element so as to keep the on duty ratio of a first period allowing the passage of the secondary current at a constant value relative to a third period made up of the first period and a second period not allowing the passage of the secondary current, based on the signal generated by the secondary current on-period detection circuit and the signal generated by the secondary-current detection delay time correction circuit.

Furthermore, the secondary current on-duty control circuit is disabled for the predetermined period by the signal generated by the secondary-current detection delay time correction circuit.

Moreover, the secondary current on-duty control circuit oscillates a clock signal for turning on the switching element, the clock signal being oscillated so as to have a constant ratio between tron and troff where tron represents a period from when the predetermined period has elapsed to when the secondary current on-period detection circuit detects the off timing of the secondary current, and troff represents a period from when the secondary current on-period detection circuit detects the off timing of the secondary current to when the switching element is subsequently turned off.

Furthermore, the secondary-current detection delay time correction circuit has the predetermined period set to satisfy the following relationship:

$$\Delta t = \Delta tr(1+\alpha)/\alpha$$

where $\Delta tr$ represents the detection delay time of the secondary current on-period detection circuit, $\Delta t$ represents the predetermined period, tron represents a period from when the predetermined period $\Delta t$ has elapsed to when the secondary current on-period detection circuit detects the off timing of the secondary current, troff represents a period from when the secondary current on-period detection circuit detects the off timing of the secondary current to when the switching element is subsequently turned off, and $\alpha$ represents the ratio of tron and troff.

Moreover, the control circuit further includes:

a PFM control circuit having the function of oscillating the clock signal for turning on the switching element, and the function of changing the frequency of the clock signal according to the second DC voltage so as to keep the second DC voltage at a constant value; and a clock signal selector circuit for selecting one having a lower frequency out of the clock signal oscillated by the PFM control circuit and the clock signal oscillated by the secondary current on-duty control circuit, and turning on the switching element based on the selected clock signal.

Furthermore, the secondary current on-period detection circuit detects, as the off timing of the secondary current, the timing of the first polarity reversal of the voltage on the primary winding after the switching element is turned off.

Moreover, the transformer further includes an auxiliary winding and the secondary current on-period detection circuit detects, as the off timing of the secondary current, the timing of the first polarity reversal of a voltage on the auxiliary winging after the switching element is turned off.

Furthermore, at least a part of the control circuit and the switching element are made up of semiconductor elements formed on the same semiconductor substrate.

Moreover, a part of the control circuit and the switching element are made up of semiconductor elements formed on the same semiconductor substrate, and a part of the secondary-current detection delay time correction circuit included in the control circuit is made up of the external component of the semiconductor element. The predetermined period can be set by the external component.

Furthermore, at least a part of the control circuit and the switching element are made up of semiconductor elements formed on the same semiconductor substrate, and the semiconductor element includes at least the high-voltage input terminal of the switching element, the output terminal of the switching element, and the input terminal of the secondary current on-period detection circuit as external connecting terminals.

Moreover, at least a part of the control circuit and the switching element are made up of semiconductor elements formed on the same semiconductor substrate, and the semiconductor element includes at least the high-voltage input terminal of the switching element and the output terminal of the switching element as external connecting terminals. The high-voltage input terminal of the switching element also acts as the input terminal of the secondary current on-period detection circuit.

According to a preferable embodiment of the present invention, even when the oscillation frequency of the switching element is increased, it is possible to keep constant the on duty of the secondary current passing through the secondary winding, achieving a constant current drooping characteristic with high accuracy. Therefore, a switching power supply with high accuracy can be configured with a small number of components without including an output voltage detection circuit, a constant current control circuit, and a photocoupler on the secondary side. Thus it is possible to reduce the costs and sizes of a switching power supply for the charger of portable equipment and switching power supply used for the power supply circuits of other kinds of electrical equipment.

DESCRIPTION OF THE EMBODIMENTS

Figure 1:
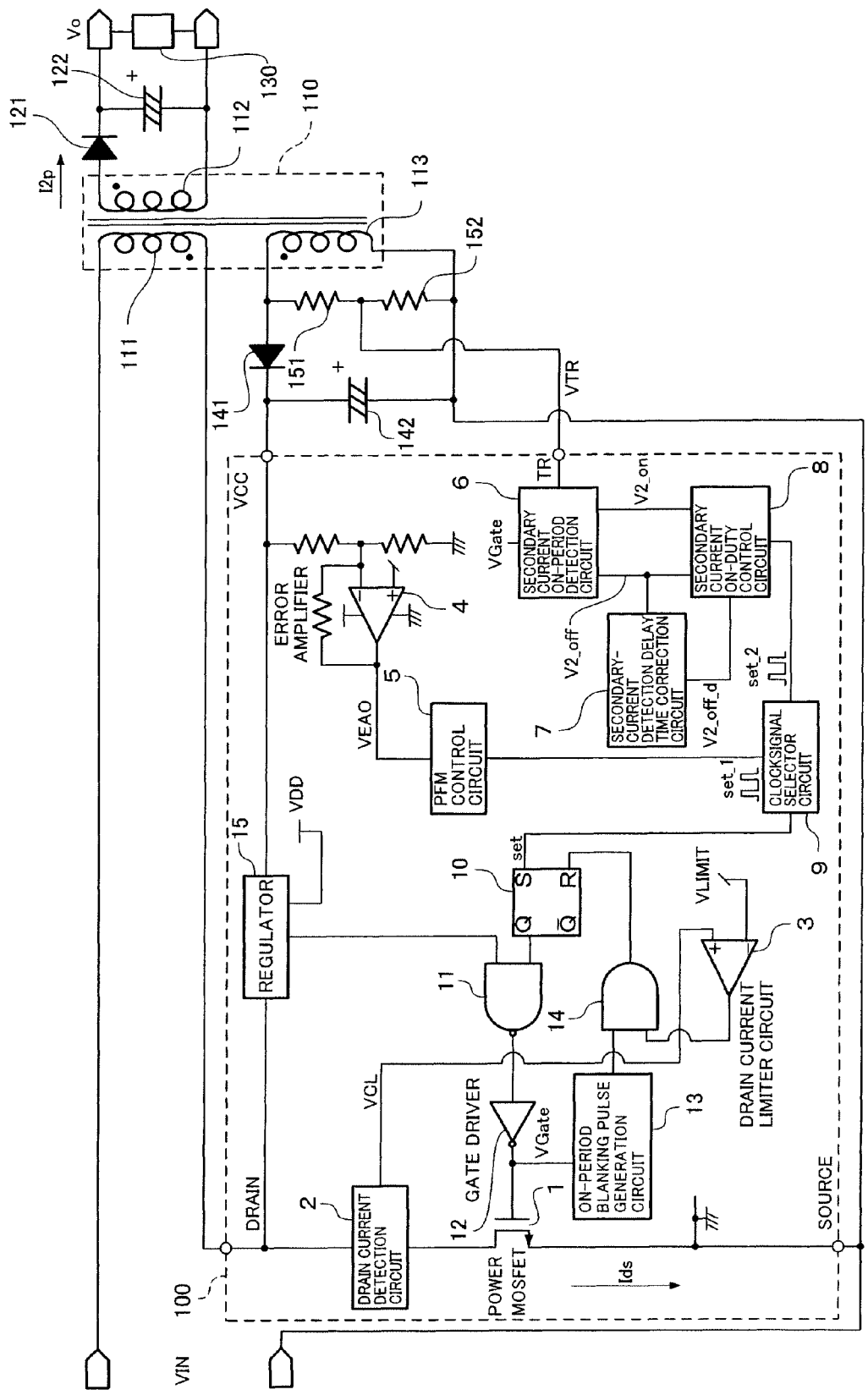
FIG. 1 is a block diagram showing a structural example of a switching power supply according to an embodiment of the present invention.

A switching power supply according to an embodiment of the present invention will be described below with reference to the accompanying drawings. FIG. 1 is a block diagram showing a structural example of the switching power supply according to the embodiment of the present invention.

In FIG. 1, a semiconductor device (regulation circuit) 100 for controlling a switching power supply includes a switching element 1 made up of a power MOSFET, and a control circuit for controlling the switching operation of the switching element 1.

The semiconductor device 100 has four terminals as external connecting terminals. The four terminals are the high-voltage input terminal (DRAIN terminal) of the switching element 1, an auxiliary power supply voltage input terminal (VCC terminal), a secondary current off-timing detection terminal (TR terminal) which is the input terminal of a secondary current on-period detection circuit (will be described later), and the GND terminal (SOURCE terminal) of the control circuit, the GND terminal also acting as the output terminal of the switching element 1.

A transformer 110 has a primary winding 111, a secondary winding 112, and an auxiliary winding 113. The primary winding 111 and the secondary winding 112 are opposite in polarity. In other words, the switching power supply is a flyback type unit. The auxiliary winding 113 and the secondary winding 112 have the same polarity. Thus on the auxiliary winding 113, an alternating voltage (auxiliary-side alternating voltage) is generated proportionately with an alternating voltage (secondary-side alternating voltage) generated on the secondary winding 112 by the switching operation of the switching element 1.

The primary winding 111 is connected to the DRAIN terminal of the semiconductor device 100. The control circuit included in the semiconductor device 100 controls the switching operation of the switching element 1, so that switching control is performed on a first DC voltage (input voltage) VIN inputted to the switching element 1 through the primary winding 111. The switching control generates an alternating voltage on the secondary winding 112 and the auxiliary winding 113. The first DC voltage VIN is, for example, a commercial alternating power supply which is rectified and smoothed.

The secondary winding 112 is connected to an output voltage generating section made up of a diode 121 and a capacitor 122. The output voltage generating section rectifies and smoothes the secondary-side alternating voltage generated on the secondary winding 112 by the switching operation of the switching element 1, so that the secondary-side alternating voltage is converted into a second DC voltage (output voltage) Vo. The output voltage generating section supplies the converted voltage Vo to a load 130.

The auxiliary winding 113 is connected to a rectifying/smoothing circuit made up of a diode 141 and a capacitor 142. The rectifying/smoothing circuit rectifies and smoothes the auxiliary-side alternating voltage generated on the auxiliary winding 113 by the switching operation of the switching element 1, so that the auxiliary-side alternating voltage is converted into an auxiliary power supply voltage VCC. The rectifying/smoothing circuit supplies the converted voltage VCC to the VCC terminal of the semiconductor device 100. The auxiliary power supply voltage VCC is proportionate to the output voltage V0 and the rectifying/smoothing circuit is used as an output voltage detecting section. The rectifying/smoothing circuit is also used as the auxiliary power supply section of the semiconductor device 100 by a regulator 15 (will be described later).

The auxiliary winding 113 is also connected to two resistors 151 and 152. The junction of the resistors 151 and 152 is connected to the TR terminal of the semiconductor device 100. Thus to the TR terminal, a voltage (TR terminal voltage VTR) obtained by dividing the auxiliary-side alternating voltage is applied. As will be described later, the semiconductor device 100 detects the timing of the falling edge of the TR terminal voltage VTR as the timing (the off timing of the secondary current) of the end of the current (secondary current) that starts passing through the secondary winding 112 after the switching element 1 is turned off.

The following will describe the control circuit included in the semiconductor device 100. The control circuit is broadly divided into a turn-off control function of determining the timing for turning off the switching element 1, a turn-on control function of determining the timing for turning on the switching element 1, a switching control function of controlling the switching operation of the switching element 1, a malfunction preventing function of preventing the switching element 1 from being turned off by a spike current generated when the switching element 1 is turned on, and an internal power supply voltage control function of controlling an internal power supply voltage VDD of the control circuit.

Further, the turn-on control function is broadly divided into a constant voltage control function of PFM control, a constant current control function of controlling an output current Io to a constant current in a certain load range, and a clock signal selecting function of selecting one of first and second clock signals oscillated by the constant voltage control function and the constant current control function.

In the following explanation, the turn-off control function, the constant voltage control function, the constant current control function, the clock signal selecting function, the switching control function, the malfunction preventing function, and the internal power supply voltage control function will be described in this order.

First, the turn-off control function will be discussed below. This function is realized by a drain current detection circuit 2 and a drain current limiter circuit 3.

The drain current detection circuit 2 is connected to the DRAIN terminal. The drain current detection circuit 2 detects a drain current Ids passing through the switching element 1 and generates a drain current detection signal VCL having a voltage corresponding to the current value of the drain current Ids.

The drain current limiter circuit 3 compares a predetermined reference voltage (overcurrent protection reference voltage) VLIMIT and the voltage value of a drain current detection signal VCL. When the voltage value of the drain current detection signal VCL reaches the overcurrent protection reference voltage VLIMIT, the drain current limiter circuit 3 generates a reset signal for turning off the switching element 1. When the reset signal is inputted to the reset terminal R of a flip-flop circuit 10 through an AND circuit 14, the flip-flop circuit 10 is reset. When the flip-flop circuit 10 is reset, the switching element 1 is turned off.

In this way, when the drain current Ids reaches a set value determined by the overcurrent protection reference voltage VLIMIT, the drain current limiter circuit 3 generates the signal for turning off the switching element 1. Thus the peak value of the drain current Ids is fixed at the set value determined by the overcurrent protection reference voltage VLIMIT.

Next, the constant voltage control function performed by PFM control will be discussed below. This function is realized by an error amplifier 4 and a PFM control circuit 5.

The auxiliary power supply voltage VCC inputted to the VCC terminal is proportionate to the second DC voltage Vo supplied to the load 130. The error amplifier 4 compares the auxiliary power supply voltage VCC and a reference voltage for stabilization and generates an error voltage signal VEAO based on a difference between the voltages. To be specific, when the load 130 increases and the output voltage Vo decreases, the signal level (voltage) of the error voltage signal VEAO increases. Conversely, when the load 130 decreases and the output voltage Vo increases, the signal level (voltage) of the error voltage signal VEAO decreases.

The PFM control circuit 5 includes an oscillator for oscillating a first clock single set_1. The oscillator oscillates the first clock signal set_1 for turning on the switching element 1. Further, the PFM control circuit 5 changes the frequency of the first clock signal set_1 according to the error voltage signal VEAO (output voltage Vo) so as to keep the output voltage Vo at a constant value. To be specific, when the voltage of the error voltage signal VEAO increases, the PFM control circuit 5 increases the frequency of the first clock signal set_1. Conversely, when the voltage of the error voltage signal VEAO decreases, the PFM control circuit 5 reduces the frequency of the first clock signal set_1. The first clock signal set_1 controls the timing for turning on the switching element 1 in a constant voltage region and thus the output voltage Vo of the switching power supply is kept constant by the first clock signal set_1 in the constant voltage region.

Next, the constant current control function will be discussed below. This function is realized by a secondary current on-period detection circuit 6, a secondary-current detection delay time correction circuit 7, and a secondary current on-duty control circuit 8. This function makes it possible to control the oscillation frequency of the switching element 1 so as to have a constant on-duty ratio (the duty ratio of the secondary current) in the on-period of the secondary current relative to a third period made up of a first period (the on period of the secondary current) allowing the passage of the secondary current and a second period (the off period of the secondary current) not allowing the passage of the secondary current, that is, relative to the oscillation period of the switching element 1, and to control an output current to a constant current in a certain load range.

The secondary current on-period detection circuit 6 is connected to the TR terminal to detect the off timing of the secondary current from the TR terminal voltage VTR. Further, the secondary current on-period detection circuit 6 detects the timing of the start of the secondary current (the on timing of the secondary current) from a driving signal VGate generated by a gate driver 12 (will be described later). In this way, the secondary current on-period detection circuit 6 detects the on period of the secondary current. And then, the secondary current on-period detection circuit 6 generates a signal indicating the detected on timing and off timing of the secondary current, that is, a signal V2_on indicating the on period of the secondary current. Further, the secondary current on-period detection circuit 6 generates an inverted signal V2_off of the signal V2_on. In this case, the signal V2_on is a logic signal which is at a high level during the detected on period of the secondary current and is inverted to a low level at the detected off timing of the secondary current.

In other words, in the flyback switching power supply, a current passes through the primary winding 111 of the transformer 110 and energy is stored in the transformer 110 during the on period of the switching element 1, and then the energy stored in the transformer 110 is released and the current (secondary current) passes through the secondary winding 112 of the transformer 110 during the off period of the switching element 1. Thereafter, when the secondary current becomes 0, resonance is produced by the inductance of the transformer 110 and the parasitic capacitance of the switching element 1. The resonance occurs on each winding of the transformer 110. In the present embodiment, the secondary current on-period detection circuit 6 connected to the auxiliary winding 113 via the TR terminal detects, as the off timing of the secondary current, the timing of the first falling edge appearing on the waveform of the auxiliary-side alternating voltage after the switching element 1 is turned off (the timing of the polarity reversal of the voltage).

Since the secondary current starts flowing when the switching element 1 is turned off, the secondary current on-period detection circuit 6 detects, as the on timing of the secondary current, the falling edge of the driving signal VGate generated by the gate driver 12.

The secondary-current detection delay time correction circuit 7 generates a signal V2_off_d indicating a time at which a predetermined period has elapsed after the switching element 1 is turned off, based on the signal V2_off generated by the secondary current on-period detection circuit 6. To be specific, the secondary-current detection delay time correction circuit 7 generates the signal V2_off_d which is at a high level at the off timing of the secondary current, the off timing having been detected by the secondary current on-period detection circuit 6. The signal V2_off_d falls to a low level when the predetermined period has elapsed after the switching element 1 is turned off.

The secondary current on-duty control circuit 8 oscillates a second clock signal set_2 for turning on the switching element 1 so as to keep the duty ratio of the secondary current (the on duty of the secondary current) at a predetermined value (constant value), based on the signal V2_on generated by the secondary current on-period detection circuit 6 and the signal V2_off_d generated by the secondary-current detection delay time correction circuit 7.

In the constant current region, the flip-flop circuit 10 enters a set status and the switching element 1 is turned on every time the second clock signal set_2 rises. Thus in the constant current region, the oscillation frequency of the switching element 1 is determined by the second clock signal set_2. The frequency of the second clock signal set_2 decreases with an increase in the current passing through the load 130 and an increase in the on period of the secondary current.

Next, the clock signal selecting function will be discussed below. This function is realized by a clock signal selector circuit 9. The clock signal selector circuit 9 selects one having a lower frequency, that is, one having a longer period out of the first clock signal set_1 oscillated by the PFM control circuit 5 and the second clock signal set_2 oscillated by the secondary current on-duty control circuit 8, and the clock signal selector circuit 9 inputs the selected signal to the set terminal of the flip-flop circuit 10.

Thus in the constant voltage region where the on duty of the secondary current does not reach the constant value, the clock signal selector circuit 9 selects the first clock signal set_1 because the first clock signal set_1 has a lower frequency than the second clock signal set_2. On the other hand, in the constant current region where the load 130 exceeds a certain level and the on duty of the secondary current reaches the constant value, the clock signal selector circuit 9 selects the second clock signal set_2 because the second clock signal set_2 has a lower frequency than the first clock signal set_1. Consequently, one of constant voltage control and constant current control is selected according to the load of the secondary side.

Next, the switching control function will be discussed below. This function is realized by the flip-flop circuit 10, a NAND circuit 11, and the gate driver 12.

The flip-flop circuit 10 has the set terminal fed with the clock signal "set" having been selected by the clock signal selector circuit 9, and the flip-flop circuit 10 enters a set status when the clock signal "set" rises. Further, the flip-flop circuit 10 enters a reset status when the reset signal is inputted to the reset terminal through the AND circuit 14. The flip-flop circuit 10 generates an output signal (first logic signal) changing between a high level and a low level depending upon whether the flip-flop circuit 10 enters the set status or the reset status. In other words, the output signal of the flip-flop circuit 10 is at a high level when the flip-flop circuit 10 enters the set status, and the output signal is at a low level when the flip-flop circuit 10 enters the reset status.

The NAND circuit 11 generates an arithmetic signal indicating an arithmetic result of the first logic signal from the flip-flop circuit 10 and a second logic signal (will be described later) from the regulator 15. As will be described later, the second logic signal from the regulator 15 is at a high level while the switching element 1 performs a switching operation.

Therefore, the arithmetic signal generated by the NAND circuit 11 changes between a high level and a low level according to the level of the first logic signal, that is, the status of the flip-flop circuit 10. In other words, the arithmetic signal is at a low level when the flip-flop circuit 10 is in the set status, and the arithmetic signal is at a high level when the flip-flop circuit 10 is in the reset status.

The gate driver 12 generates the driving signal VGate for driving the control terminal (gate terminal) of the switching element 1, based on the arithmetic signal from the NAND circuit 11. To be specific, when the arithmetic signal is at a low level, the gate driver 12 sets the voltage level of the driving signal VGate at a first level to turn on the switching element 1, and when the arithmetic signal is at a high level, the gate driver 12 sets the voltage level of the driving signal VGate at a second level lower than the first level to turn off the switching element 1.

In this way, the control circuit changes the signal level of the driving signal VGate for driving the gate terminal of the switching element 1, between a turn-on level (first level) for turning on the switching element 1 and a turn-off level (second level) for turning off the switching element 1 in response to the clock signal "set" and the reset signal.

The switching element 1 is repeatedly turned on and off (switching operation) in response to the driving signal VGate from the gate driver 12, and switching control is performed on the first DC voltage VIN inputted to the primary winding 111 of the transformer 110. The switching control generates the secondary-side alternating voltage on the secondary winding 112 and the auxiliary-side alternating voltage on the auxiliary winding 113.

Next, the malfunction preventing function will be discussed below. This function is realized by an on-period blanking pulse generation circuit 13 and the AND circuit 14.

During a set period of time from the rising edge of the driving signal VGate generated by the gate driver 12 (from the turn-on level), the on-period blanking pulse generation circuit 13 sets, at a low level, the signal inputted to the AND circuit 14. Thus even when the reset signal is generated in the drain current limiter circuit 3, the flip-flop circuit 10 is not reset during the set period from when the switching element 1 is turned on, thereby preventing erroneous detection caused by spike current when the switching element 1 is turned on.

Next, the internal power supply voltage control function will be discussed below. This function is realized by the regulator 15. The regulator 15 supplies a current from one of the DRAIN terminal and the VCC terminal to the internal circuit power supply VDD of the semiconductor circuit 100 and stabilizes the voltage of the internal circuit power supply VDD at a constant value.

To be specific, before the switching operation of the switching element 1 is started, the regulator 15 supplies the current from the DRAIN terminal to the internal circuit power supply VDD to increase the voltage of the internal circuit power supply VDD and also to the capacitor 142 of the auxiliary power supply via the VCC terminal to increase the voltage of the auxiliary power supply VCC. Meanwhile, the regulator 15 sets, at a low level, the signal level of the second logic signal inputted to the NAND circuit 11, so that the switching element 1 is not turned on.

When the voltage of the internal circuit power supply VDD reaches the constant value, the regulator 15 sets the second logic signal at a high level to permit the switching operation of the switching element 1. On the other hand, when the voltage of the internal circuit power supply VDD increases, the oscillator included in the PFM control circuit 5 starts oscillation. Thus when the voltage of the internal circuit power supply VDD reaches the constant value, the switching operation is started.

After the switching operation of the switching element 1 is started, a terminal for supplying current to the internal circuit power supply VDD is determined according to the value of the auxiliary power supply voltage VCC. In other words, when the auxiliary power supply voltage VCC is not lower than the constant value, the regulator 15 supplies current from the VCC terminal to the internal circuit power supply VDD, thereby reducing the power consumption of the semiconductor device 100. On the other hand, when the auxiliary power supply voltage VCC falls below the constant value, the regulator 15 supplies current from the DRAIN terminal to the internal circuit power supply VDD. In this way, the regulator 15 stabilizes the internal circuit power supply VDD at the constant value.

Figure 2:
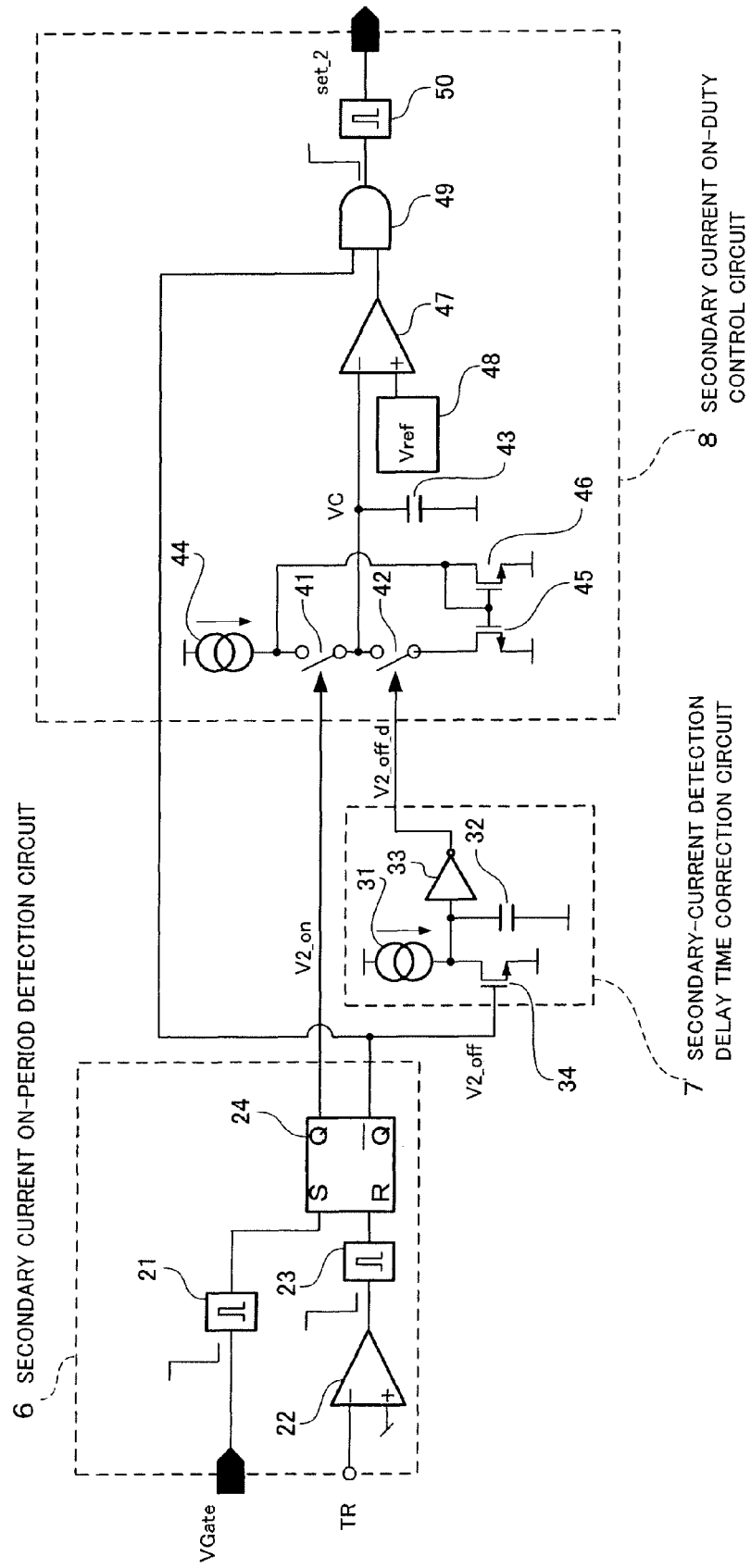
FIG. 2 is a block diagram showing a structural example of a secondary current on-period detection circuit, a secondary-current detection delay time correction circuit, and a secondary current on-duty control circuit which compose a part of a semiconductor device of the switching power supply according to the embodiment of the present invention.

The following will more specifically describe the constant current control function of the switching power supply according to the present embodiment. FIG. 2 is a block diagram showing a structural example of the secondary current on-period detection circuit 6, the secondary-current detection delay time correction circuit 7, and the secondary current on-duty control circuit 8 which compose a part of the semiconductor device 100 of the switching power supply according to the embodiment of the present invention.

The secondary current on-period detection circuit 6 is made up of one-pulse signal generation circuits 21 and 23, a comparator 22, and a flip-flop circuit 24 which are connected as shown in FIG. 2.

The one-pulse signal generation circuit 21 is fed with the driving signal VGate generated by the gate driver 12. The one-pulse signal generation circuit 21 generates a one-pulse signal when the falling edge of the driving signal from the gate driver 12 is detected, that is, when the switching element 1 is turned off, and the one-pulse signal generation circuit 21 inputs the one-pulse signal to the set terminal of the flip-flop circuit 24 to bring the flip-flop circuit 24 into a set status.

The comparator 22 compares the TR terminal voltage VTR and a predetermined reference voltage to detect the falling edge of the TR terminal voltage VTR, that is, the first polarity reversal of the voltage of the auxiliary winding 113 after the switching element 1 is turned off. The one-pulse signal generation circuit 23 generates a one-pulse signal when the falling edge of the TR terminal voltage VTR is detected by the comparator 22, and the one-pulse signal generation circuit 23 inputs the one-pulse signal to the reset terminal of the flip-flop circuit 24 to bring the flip-flop circuit 24 into a reset status. Thus when the TR terminal voltage VTR is detected according to the reference voltage, the signal levels of the output signal V2_on and the inverted output signal V2_off of the flip-flop circuit 24 are inverted.

With this configuration, in a period from when the switching element 1 is turned off until the falling edge of the TR terminal voltage VTR is detected, the output signal V2_on of the flip-flop circuit 24 is at a high level and the inverted output signal V2_off is at a low level. After that, when the falling edge of the TR terminal voltage VTR is detected, the signal levels of the output signal V2_on and the inverted output signal V2_off of the flip-flop circuit 24 are inverted. The signal V2_on is at a low level and the signal V2_off is at a high level in a period from when the falling edge of the TR terminal voltage VTR is detected to when the switching element 1 is subsequently turned on and is turned off again.

The secondary-current detection delay time correction circuit 7 is made up of a constant current source 31, a capacitor 32, a reverser 33, and a switch 34 which are connected as shown in FIG. 2.

The control terminal of the switch 34 is driven by the signal V2_off generated by the flip-flop circuit 24 in the secondary current on-period detection circuit 6. To be specific, the switch 34 is turned on in a period from when the falling edge of the TR terminal voltage VTR is detected to when the switching element 1 is subsequently turned on and is turned off again, and the switch 34 is turned off in a period from when the switching element 1 is turned off to when the falling edge of the TR terminal voltage VTR is detected.

One of the terminals of the switch 34 is connected to the constant current source 31 and the capacitor 32 and the other terminal of the switch 34 is grounded. The capacitor 32 is charged and discharged by turning on and off the switch 34. In other words, when the switch 34 is turned on at the falling edge of the TR terminal voltage VTR, the capacitor 32 is discharged. When the switch 34 is turned off at a time when the switching element 1 is turned off, the capacitor 32 is charged. A charged/discharged current at that time is determined by a constant current generated by the constant current source 31.

The reverser 33 monitors the voltage of the capacitor 32 to generate the signal V2_off_d changing between a high level and a low level according to the voltage value of the capacitor 32. To be specific, the signal V2_off_d is at a high level at the falling edge of the TR terminal voltage VTR and falls to a low level after a predetermined period has elapsed since the switching element 1 is turned off. The predetermined period is set according to the constant current generated by the constant current source 31 and the capacitance of the capacitor 32.

The secondary current on-duty control circuit 8 is made up of switches 41 and 42, a capacitor (capacitance) 43, a constant current source 44, Nch MOSFETs 45 and 46, a comparator (comparator circuit) 47, a reference voltage source 48, an AND circuit 49, and a one-pulse signal generation circuit 50 which are connected as shown in FIG. 2.

The switch 41 is turned on when the signal V2_on from the flip-flop circuit 24 in the secondary current on-period detection circuit 6 is at a high level, and the switch 41 is turned off when the signal V2_on is at a low level. The switch 42 is turned on when the signal V2_off_d from the reverser 33 in the secondary-current detection delay time correction circuit 7 is at a high level, and the switch 42 is turned off when the signal V2_off_d is at a low level. The signal V2_on and the signal V2_off_d are both at a high level for a predetermined period set by the secondary-current detection delay time correction circuit 7, and thus the switch 41 and the switch 42 are both turned on in this predetermined period.

A charge/discharge circuit made up of the switch 41 and the switch 42 charges the capacitor 43 with a constant current generated by the constant current source 44, in a period during which the switch 41 is turned on and the switch 42 is turned off. Further, the charge/discharge circuit discharges the capacitor 43 in a period during which the switch 41 is turned off and the switch 42 is turned on. In the predetermined period during which the switch 41 and the switch 42 are both turned on, the capacitor 43 is not charged or discharged. Therefore, in the predetermined period, the secondary current on-duty control circuit 8 is in a disabled status.

As described, after the switching element 1 is turned off, in a period from when the predetermined period has elapsed to when the secondary current on-period detection circuit 6 detects the off timing of the secondary current (the timing of the falling edge of the TR terminal voltage VTR), the capacitor 43 is charged by the constant current generated by the constant current source 44, so that a voltage VC of the capacitor 43 increases. The charged current at this point is determined by the constant current generated by the constant current source 44.

Further, in a period from when the secondary current on-period detection circuit 6 detects the off timing of the secondary current (the timing of the falling edge of the TR terminal voltage VTR) to when the switching element 1 is turned off, the capacitor 43 is discharged and the voltage VC of the capacitor 43 decreases. A discharged current at this point is determined by the constant current generated by the constant current source 44 and a current mirror circuit made up of the Nch MOSFETs 45 and 46.

When the decreasing voltage VC of the capacitor 43 is detected by a reference voltage (set voltage) Vref generated by the reference voltage source 48, the comparator 47 generates a signal for turning on the switching element 1. The one-pulse signal generation circuit 50 generates a one-pulse signal when the signal generated by the comparator 47 to turn on the switching element 1 is inputted to the one-pulse signal generation circuit 50 via the AND circuit 49. The one-pulse signal is the second clock signal set_2. The AND circuit 49 allows the one-pulse signal generation circuit 50 to be fed with the signal generated by the comparator 47 to turn on the switching element 1, only when the signal V2_off from the flip-flop circuit 24 in the secondary current on-period detection circuit 6 is at a high level.

In this way, after the switching element 1 is turned off, in a period from when the predetermined period has elapsed to when the secondary current on-period detection circuit 6 detects the off timing of the secondary current (the timing of the falling edge of the TR terminal voltage VTR), the secondary current on-duty control circuit 8 charges the capacitor 43. Further, the secondary current on-duty control circuit 8 starts charging the capacitor 43 when the secondary current on-period detection circuit 6 detects the off timing of the secondary current (the timing of the falling edge of the TR terminal voltage VTR). When the voltage VC of the capacitor 43 is detected by the reference voltage Vref, the secondary current on-duty control circuit 8 turns on the switching element 1. Even after the switching element 1 is turned on, the secondary current on-duty control circuit 8 continues charging the capacitor 43 until the peak value of the drain current Ids reaches the constant value and the switching element is turned off.

With this configuration, the secondary current on-duty control circuit 8 oscillates the second clock signal (one-pulse signal) set_2 for turning on the switching element 1 so as to keep the on duty of the secondary current at a predetermined value.

Figure 3:
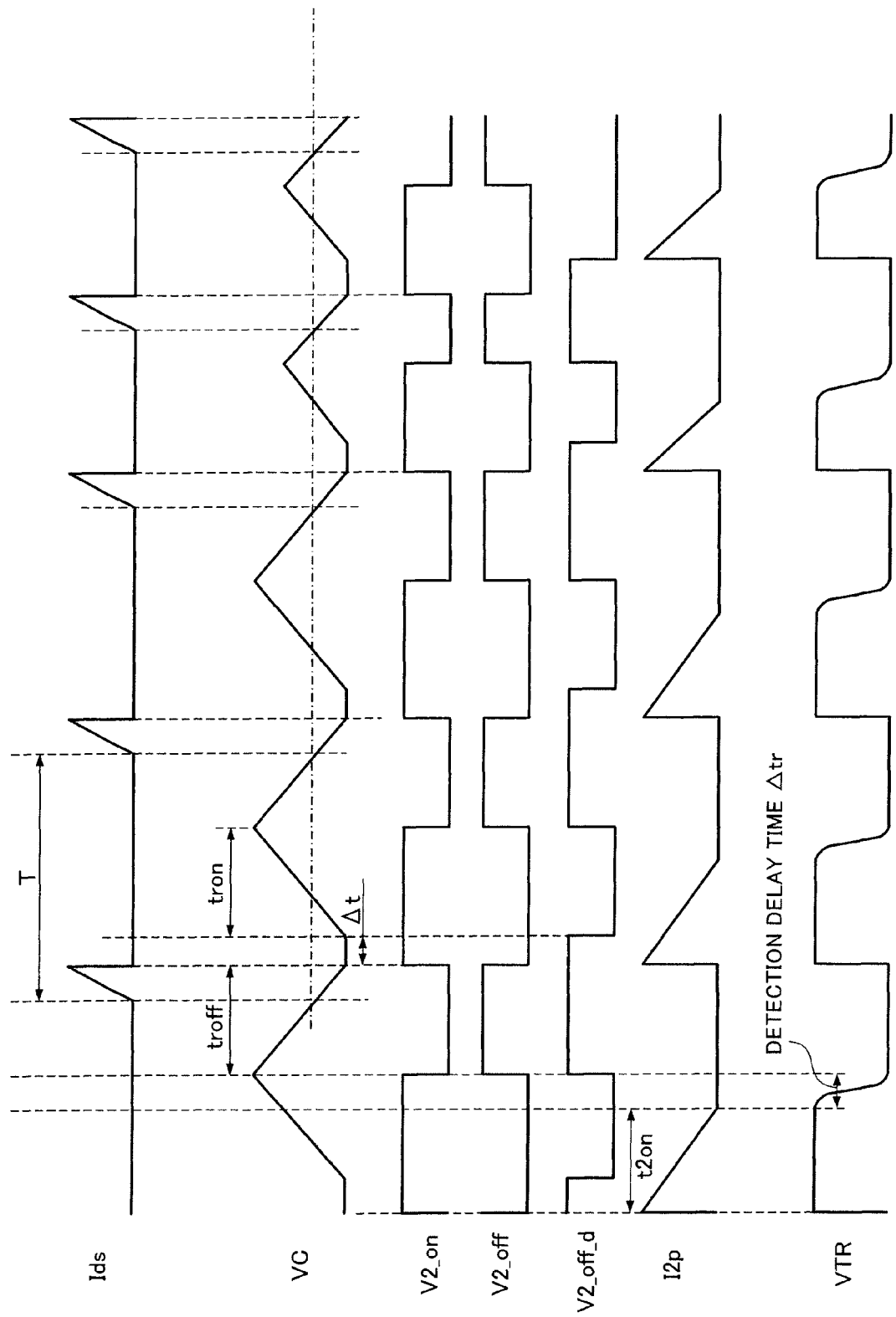
FIG. 3 illustrates a timing chart showing signal waveforms in the constant current region of the switching power supply according to the embodiment of the present invention.

Referring to FIG. 3, the following will discuss operations in the constant current region of the switching power supply according to the embodiment of the present invention. FIG. 3 is a timing chart showing signal waveforms in the constant current region of the switching power supply according to the embodiment of the present invention. FIG. 3 shows, from the top, the waveform of the drain current Ids passing through the switching element, the waveform of the voltage VC of the capacitor 43 in the secondary current on-duty control circuit 8, the waveforms of the signals V2_on and V2_off generated by the flip-flop circuit 24 in the secondary current on-period detection circuit 6, the waveform of the signal V2_off_d generated by the reverser 33 in the secondary-current detection delay time correction circuit 7, the waveform of a secondary current I2p, and the waveform of the TR terminal voltage VTR.

The TR terminal voltage VTR rises when the switching element 1 is turned off, and the TR terminal voltage VTR starts falling when the secondary current I2p stops flowing. The falling edge of the waveform gradually changes as an LC resonance waveform of an inductance L of the transformer 110 and a capacitance C between the drain and source of a power MOSFET composing the switching element 1. On the other hand, the reference voltage for detecting the timing of the falling edge of the TR terminal voltage VTR is set low in response to fluctuations in the input voltage (the first DC voltage VIN). The secondary current on-period detection circuit 6 detects a time at which the TR terminal voltage VTR decreases to a certain level. Thus correctly, the signal V2_on is set at a high level in a period that is longer than the on period of the secondary current I2p by a certain period of time. The detection delay time is represented as Δtr.

The signal V2_off_d generated by the secondary-current detection delay time correction circuit 7 is kept at a high level for a given delay time (predetermined period) Δt even after the switching element 1 is turned off and the signal V2_off is inverted to a low level. As a result, after the switching element 1 is turned off, the switches 41 and 42 in the secondary current on-duty control circuit 8 are both continuously turned on until the lapse of the predetermined period Δt set by the secondary-current detection delay time correction circuit 7. Thus as shown in FIG. 3, the voltage VC of the capacitor 43 is kept at a constant voltage in the predetermined period Δt.

The charging of the capacitor 43 is started after the lapse of the predetermined period Δt, and the charging is stopped when the TR terminal voltage VTR falls and the signal V2_on is inverted. And then, the discharging of the capacitor 43 is started from the inversion of the signal V2_on. The ratio of the charged current and the discharged current of the capacitor 43 is determined by the mirror ratio of the current mirror circuit made up of the Nch MOSFETs 45 and 46 shown in FIG. 2. The discharging is continued until the switching element 1 is turned off.

Therefore, as shown in FIG. 3, a charging period tron of the capacitor 43 is equal to a period during which the signal V2_off_d is at a low level, that is, a period from when the predetermined period Δt set by the secondary-current detection delay time correction circuit 7 has elapsed after the switching element 1 is turned off to when the secondary current on-period detection circuit 6 detects the off timing of the secondary current (the timing of the falling edge of the TR terminal voltage VTR). Further, a discharging period troff of the capacitor 43 is equal to a period during which the signal V2_on is at a high level, that is, a period from when the secondary current on-period detection circuit 6 detects the off timing of the secondary current (the timing of the falling edge of the TR terminal voltage VTR) to when the switching element 1 is turned off.

As described, the switching power supply of the present embodiment keeps the on duty of the secondary current at the predetermined value by charging and discharging the capacitor 43. The ratio of the charging period tron and the discharging period troff of the capacitor 43 is expressed by the equation below:

$$\alpha = troff/tron \quad (1)$$

where α is always kept constant.

The conditions for keeping the on duty of the secondary current at the predetermined value will be described below. When the on duty of the secondary current is kept at the predetermined value, as shown in FIG. 3, a period obtained by adding the detection delay time Δtr to an actual on period t2on of the secondary current is equal to a period obtained by adding the predetermined period (delay time) Δt to the charging period tron of the capacitor 43. Thus the following relationship is established:

$$\Delta t + tron = t2on + \Delta tr \quad (2).$$

The switching element 1 has an oscillation period T expressed by the following equation:

$$T = t2on + \Delta tr + troff \quad (3).$$

Further, the following relationship is established based on the equations (1) and (3):

$$T = t2on + \Delta tr + \alpha \cdot tron \quad (4).$$

Thus based on the equations (2) and (4), the following relationship is established:

$$T = t2on + \Delta tr + \alpha(t2on + \Delta tr - \Delta t) = (1+\alpha)t2on + (1+\alpha)\Delta tr - \alpha \Delta t.$$

Moreover, the following equation is obtained:

$$t2on = T/(1+\alpha) - \{(1+\alpha)\Delta tr - \alpha \Delta t\}/(1+\alpha) \quad (5).$$

The secondary current has an on duty D2on expressed by the following equation:

$$D2on = t2on/T.$$

Thus based on the equation (5), the following relationship is established:

$$D2on = 1/(1+\alpha) - \{(1+\alpha)\Delta tr - \alpha \Delta t\}/(1+\alpha) \cdot T.$$

Thus the on duty D2on of the secondary current is always kept constant when the following relationship is satisfied:

$$(1+\alpha)\Delta tr - \alpha \Delta t = 0.$$

In other words, the on duty D2on of the secondary current is always kept constant and a constant current drooping characteristic can be obtained with high accuracy when the set period Δt, that is, the capacitance of the capacitor 32 in the secondary-current detection delay time correction circuit 7 is set so as to satisfy the following relationship:

$$\Delta t/\Delta tr = (1+\alpha)/\alpha.$$

Figure 4:
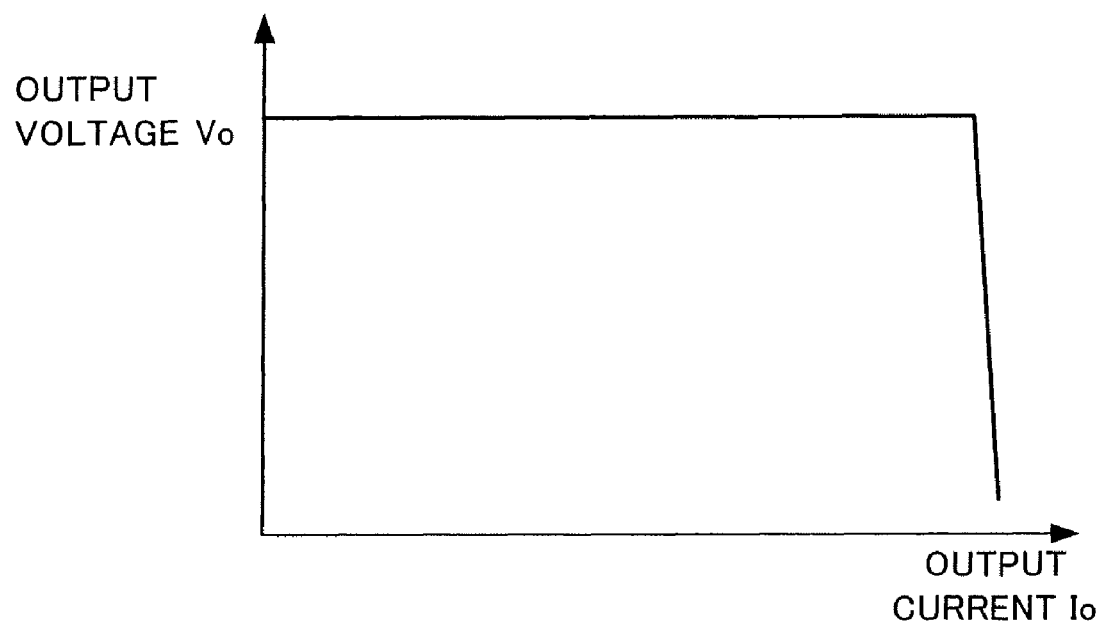
FIG. 4 illustrates the output characteristics of the switching power supply according to the embodiment of the present invention.
Figure 7:
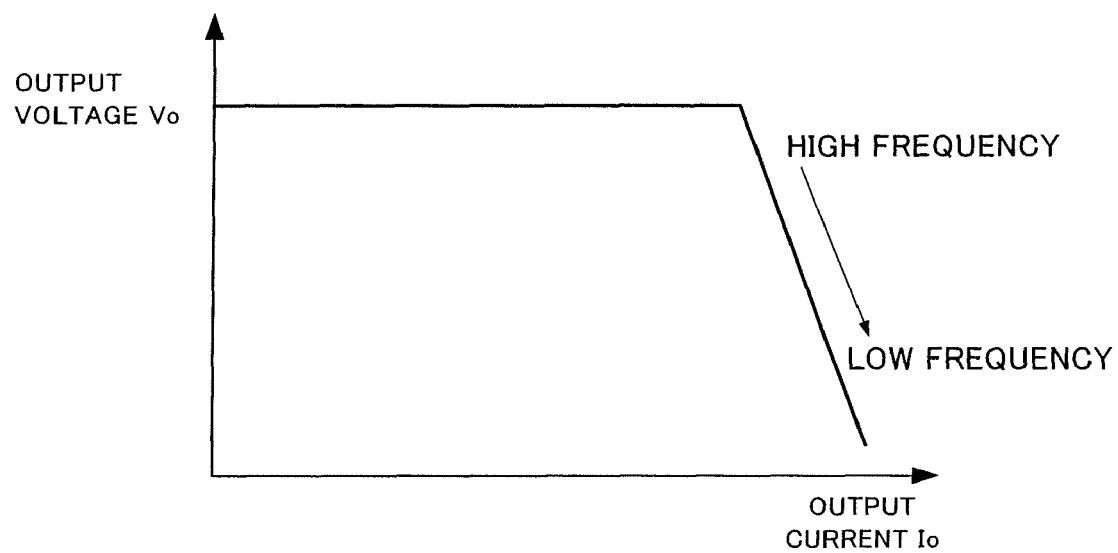
FIG. 7 illustrates the output characteristics of the conventional switching power supply.

FIG. 4 shows the output characteristic of the switching power supply according to the embodiment of the present invention. In the conventional switching power supply, as shown in FIG. 7, the higher the output voltage Vo, the lower the output current Io in the constant current region. In the switching power supply of the present embodiment, as shown in FIG. 4, an output current Io can be kept constant in the constant current region regardless of an output voltage Vo.

In this way, the switching power supply of the present embodiment makes it possible to perform constant voltage control and constant current control on the primary side, thereby achieving a constant current characteristic with high accuracy even when the frequency is increased for the size reduction of the switching power supply. Thus the switching power supply of the present embodiment is useful for reducing the cost and size of a switching power supply for a charger.

Further, according to the switching power supply of the present embodiment, the switching element 1 and the control circuit are formed on the same semiconductor substrate, thereby reducing the number of components composing the circuit of the switching power supply. It is thus possible to easily reduce the size, weight, and cost.

Next, another example of the switching power supply according to the embodiment of the present invention will be described below.

Figure 5:
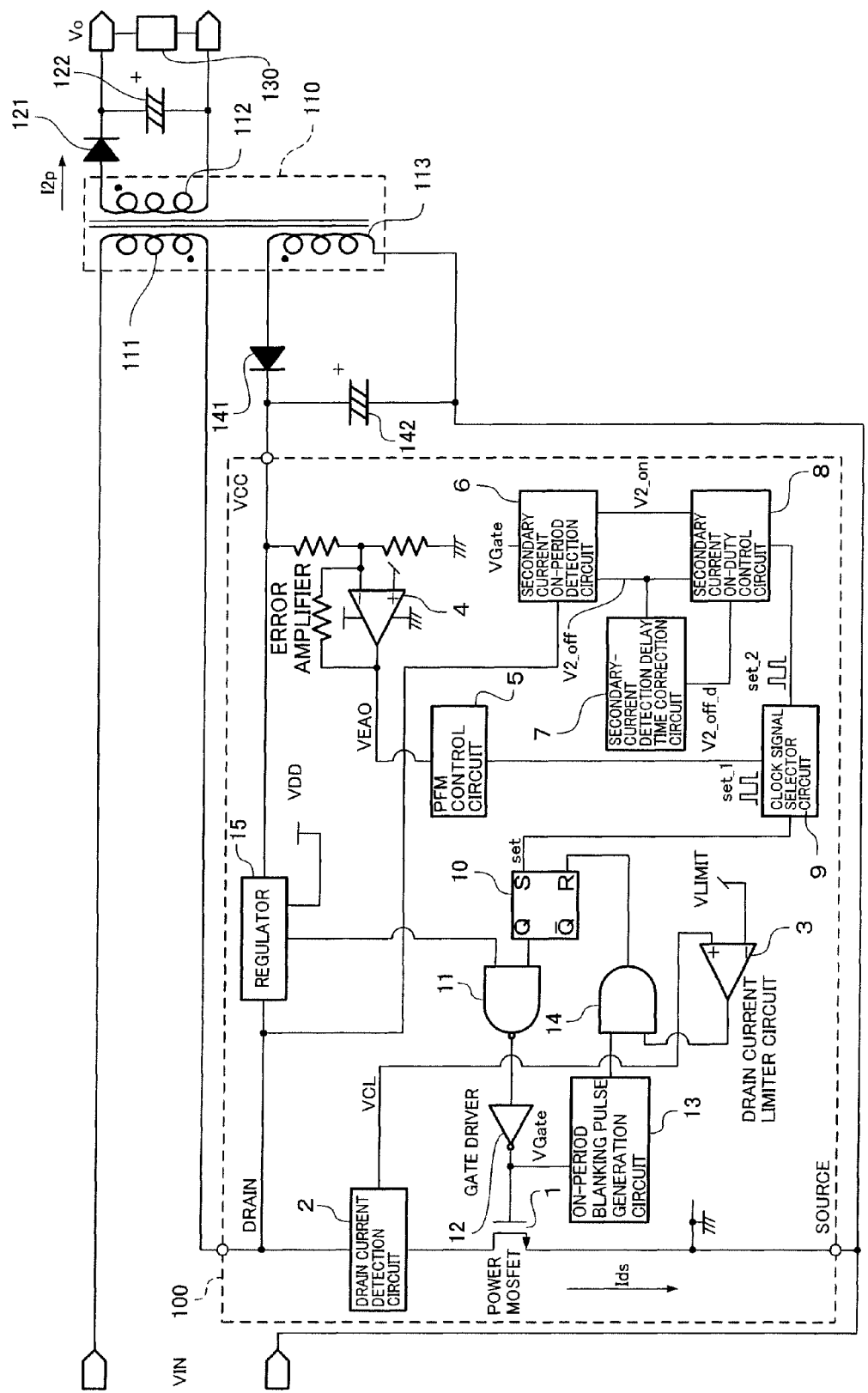
FIG. 5 is a block diagram showing another example of the switching power supply according to the embodiment of the present invention.
Figure 6:
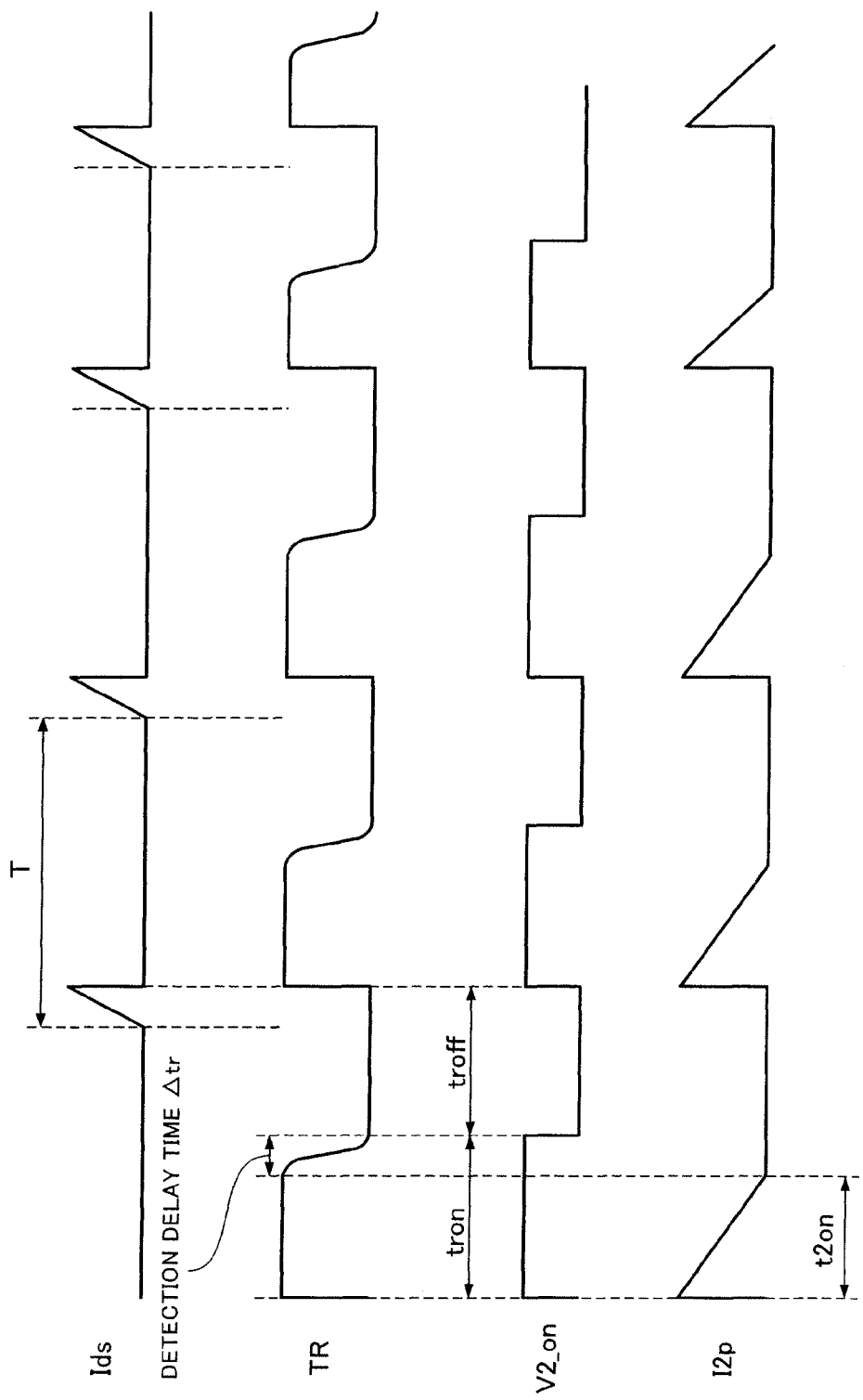
FIG. 6 illustrates a timing chart showing signal waveforms in the constant current region of a conventional switching power supply.

FIG. 5 shows another example of the switching power supply according to the embodiment of the present invention. As shown in FIG. 5, the input terminal of a secondary current on-period detection circuit 6 may be a DRAIN terminal. With this configuration, a semiconductor device 100 can be made up of three terminals, further reducing the number of components of the switching power supply. However, the input circuit of the secondary current on-period detection circuit 6 has to be a high-voltage device.

For example, a capacitor 32 of a secondary-current detection delay time correction circuit 7 may be an external component (not shown) of the semiconductor device 100. This configuration can adjust the predetermined period Δt according to the specifications of the power supply, thereby responding to power supplies of various specifications.

What is claimed is:

1. A switching power supply, comprising:
    a transformer having a primary winding and a secondary winding;
    a switching element connected to the primary winding;
    a control circuit for performing switching control on a first DC voltage inputted to the switching element through the primary winding, by controlling a switching operation of the switching element; and
    an output voltage generating section for converting a voltage generated on the secondary winding by the switching operation of the switching element into a second DC voltage, and supplying the second DC voltage to a load,
    wherein the control circuit comprises:
    a drain current limiter circuit for generating a signal for turning off the switching element when a current passing through the switching element reaches a set value;
    a secondary current on-period detection circuit for detecting, from a voltage generated on each winding of the transformer by the switching operation of the switching element, off timing of secondary current starting passing through the secondary winding when the switching element is turned off, and generating a signal indicating the detected off timing of the secondary current;
    a secondary-current detection delay time correction circuit for generating a signal indicating a time when a predetermined period has elapsed since the switching element is turned off; and
    a secondary current on-duty control circuit for oscillating a clock signal for turning on the switching element so as to keep an on duty ratio of a first period allowing passage of the secondary current at a constant value relative to a third period made up of the first period and a second period not allowing passage of the secondary current, based on the signal generated by the secondary current on-period detection circuit and the signal generated by the secondary-current detection delay time correction circuit.

2. The switching power supply according to claim 1, wherein the secondary current on-duty control circuit is disabled for the predetermined period by the signal generated by the secondary-current detection delay time correction circuit.

3. The switching power supply according to claim 1, wherein the secondary current on-duty control circuit oscillates a clock signal for turning on the switching element, the clock signal being oscillated so as to have a constant ratio between tron and troff where tron represents a period from when the predetermined period has elapsed to when the secondary current on-period detection circuit detects the off timing of the secondary current, and troff represents a period from when the secondary current on-period detection circuit detects the off timing of the secondary current to when the switching element is subsequently turned off.

4. The switching power supply according to claim 1, wherein the secondary-current detection delay time correction circuit has the predetermined period set to satisfy the following relationship:

$$\Delta t = \Delta tr(1+\alpha)/\alpha$$

where Δtr represents a detection delay time of the secondary current on-period detection circuit, Δt represents the predetermined period, tron represents a period from when the predetermined period Δt has elapsed to when the secondary current on-period detection circuit detects the off timing of the secondary current, troff represents a period from when the secondary current on-period detection circuit detects the off timing of the secondary current to when the switching element is subsequently turned off, and $\alpha$ represents a ratio of tron and troff.

5. The switching power supply according to claim 1, wherein the control circuit further comprises:
   a PFM control circuit having a function of oscillating the clock signal for turning on the switching element, and a function of changing a frequency of the clock signal according to the second DC voltage so as to keep the second DC voltage at a constant value; and
   a clock signal selector circuit for selecting one having a lower frequency out of the clock signal oscillated by the PFM control circuit and the clock signal oscillated by the secondary current on-duty control circuit, and turning on the switching element based on the selected clock signal.

6. The switching power supply according to claim 1, wherein the secondary current on-period detection circuit detects, as the off timing of the secondary current, timing of first polarity reversal of the voltage on the primary winding after the switching element is turned off.

7. The switching power supply according to claim 1, wherein the transformer further comprises an auxiliary winding and the secondary current on-period detection circuit detects, as the off timing of the secondary current, timing of first polarity reversal of a voltage on the auxiliary winging after the switching element is turned off.

8. The switching power supply according to claim 1, wherein at least a part of the control circuit and the switching element are made up of semiconductor elements formed on the same semiconductor substrate.

9. The switching power supply according to claim 8, wherein a part of the secondary-current detection delay time correction circuit is made up of an external component of the semiconductor element, and the predetermined period can be set by the external component.

10. The switching power supply according to claim 8, wherein the semiconductor element comprises at least a high-voltage input terminal of the switching element, an output terminal of the switching element, and an input terminal of the secondary current on-period detection circuit as external connecting terminals.

11. The switching power supply according to claim 8, wherein the semiconductor element comprises at least a high-voltage input terminal of the switching element and an output terminal of the switching element as external connecting terminals, and the high-voltage input terminal of the switching element also acts as an input terminal of the secondary current on-period detection circuit.

* * * * *